Figure 7:
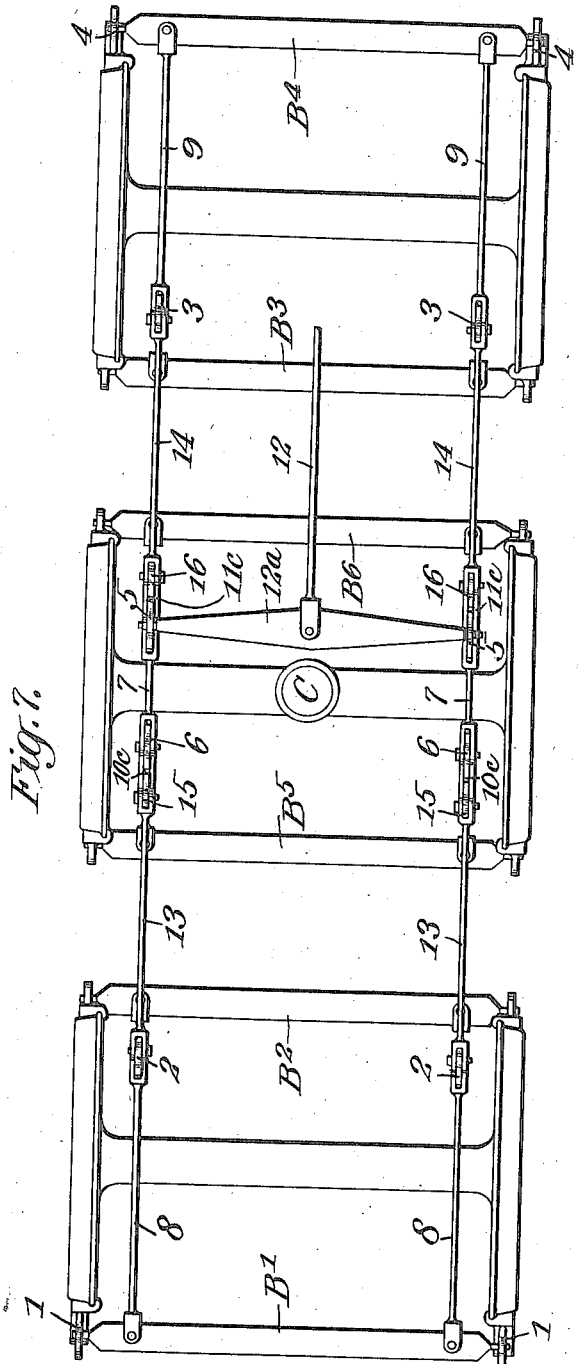

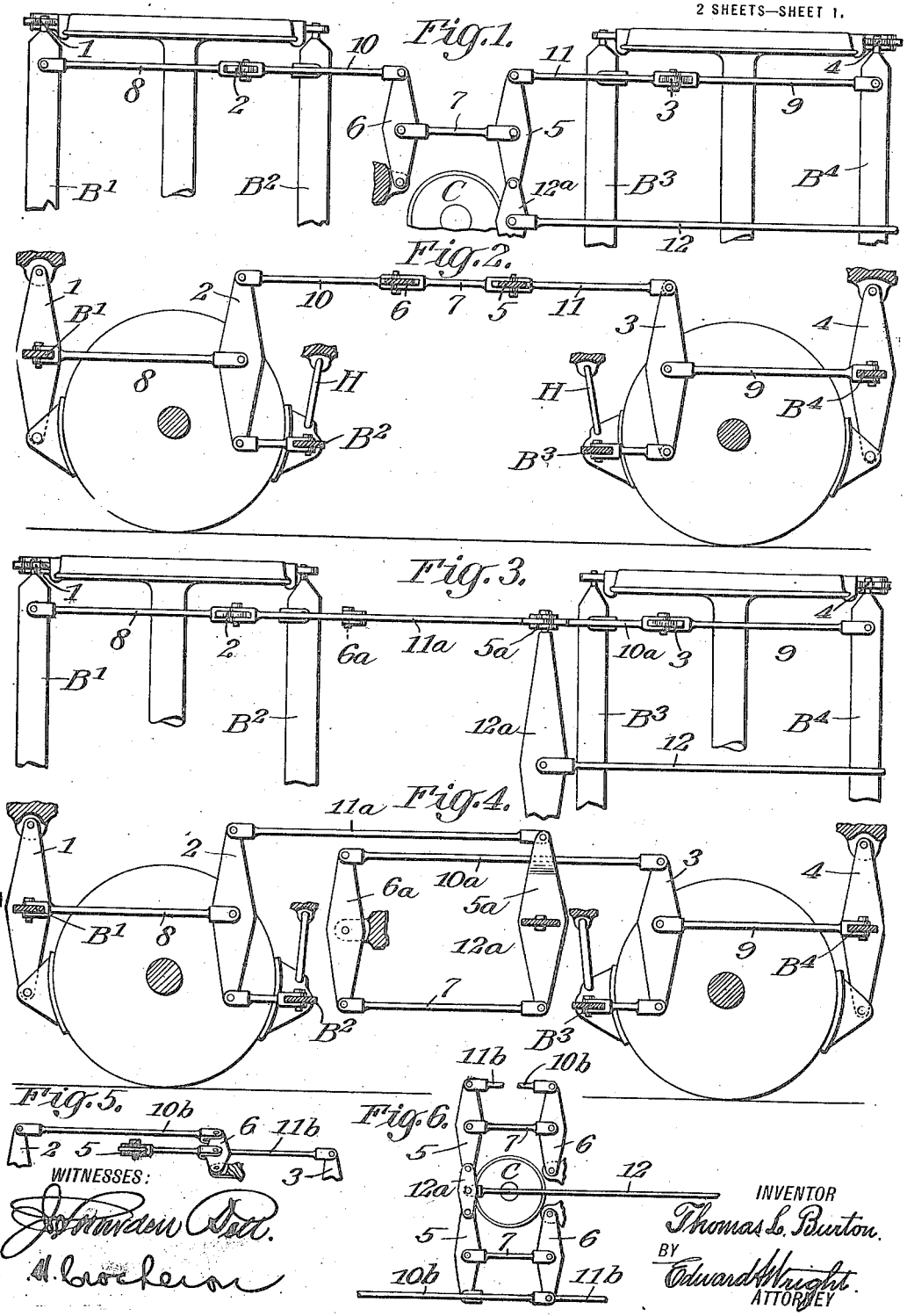

T. L. BURTON.
BRAKE RIGGING.
APPLICATION FILED AUG. 21, 1913.

1,166,176.

Patented Dec. 28, 1915.
2 SHEETS—SHEET 2.

WITNESSES.

INVENTOR
Thomas L. Burton
BY
Edward Wright.
ATTORNEY

UNITED STATES PATENT OFFICE.

THOMAS L. BURTON, OF PITTSBURGH, PENNSYLVANIA, ASSIGNOR, BY MESNE ASSIGNMENTS, TO AMERICAN BRAKE COMPANY, OF ST. LOUIS, MISSOURI, A CORPORATION OF MISSOURI.

BRAKE-RIGGING.

1,166,176.  Specification of Letters Patent.  Patented Dec. 28, 1915.

Application filed August 21, 1913. Serial No. 785,902.

*To all whom it may concern:*

Be it known that I, THOMAS L. BURTON, a citizen of the United States, residing at Pittsburgh, in the county of Allegheny and State of Pennsylvania, have invented a certain new and useful Improvement in Brake-Rigging, of which improvement the following is a specification.

This invention relates to the clasp type of brake rigging for railway cars, and in which brake shoes are applied to both sides of each pair of truck wheels.

The principal object of my invention is to provide an improved construction of this type, in which a double set of truck levers and rods are employed, one at each side of the truck, and having an intermediate floating lever located near the center of the truck for each of the two sets of truck rods and levers. The power from the brake cylinder is applied to both of said intermediate floating levers, and from them is transmitted by suitable connections in opposite directions to the sets of truck levers and rods and the brake shoes.

In the accompanying drawings: Figure 1 is a half plan of one form of clasp type brake applied to a four wheeled truck, and embodying my improvement; Fig. 2, a longitudinal sectional view of the same showing one set of truck rods and levers in elevation; Figs. 3 and 4, views, similar to Figs. 1 and 2 respectively, and showing a modification; Figs. 5 and 6, detail views in vertical section and plan respectively, showing another modification; and, Figs. 7 and 8, a plan and vertical longitudinal section respectively, showing still another modification of my improvement, as applied to a six wheeled truck.

My improvement is especially adapted for use in connection with pivoted trucks having a plurality of pairs of wheels, usually four or six, employed at both ends of the car, and having brake shoes applied to both sides of each pair of wheels.

According to the construction shown in Figs. 1 and 2 of the drawings, the improvement is applied to a four wheeled truck having brake beams, B¹, B², B³, and B⁴, at both sides of each pair of wheels and two sets of truck levers, 1, 2, 3, and 4, with coupling rods, 8 and 9, only one set being shown in Fig. 1, the parts being duplicated upon the other side of the truck, as will be readily understood. The intermediate floating lever, 5, is connected in one direction, by means of pull rod, 11, with the upper end of the live truck lever, 3, and in the opposite direction is coupled by rod, 7, with intermediate lever, 6, having a fixed fulcrum at one end, and a pull rod, 10, at the other end connecting with the upper end of the live truck lever, 2. The live truck levers, 2 and 3, are pivotally connected by means of links at their lower ends with the respective brake beams, B² and B³, which have brake shoes at their ends supported by suitable hangers, H. At the ends of the truck, however, or where the dead truck levers are located, the separate hangers may be eliminated, and the dead truck lever may serve as a combined hanger and lever, by supporting the brake shoe directly upon said lever, connecting the end of the beam to the lever, and attaching the pull rod to the brake beam, all as fully shown in connection with the outside dead truck levers, 1 and 4, and beams, B¹ and B⁴. In this way, the power is transmitted from the live levers, 2 and 3, by the respective rods 8 and 9, directly to the corresponding brake beams, B¹ and B⁴, which latter are attached to the respective hanger levers, 1 and 4, thereby applying all of the brake shoes with equalized pressure.

As shown in Figs. 1 and 2, the intermediate levers, 5 and 6, which are located near the center plate, C, of the truck, are substantially horizontal, and the power from the brake cylinder is applied by means of pull rod, 12, and equalizer, 12ª, connected to the inner ends of the floating levers, 5.

According to the modification shown in Figs. 3 and 4, the intermediate levers, 5ª, and 6ª, are located vertically in substantially the same plane with the truck levers at the sides of the truck, the equalizer, 12ª, in this case being made longer and connected to the middle point of the floating lever, 5ª, which is coupled by pull rod, 11ª, to the truck lever, 2, while the intermediate lever, 6ª, has a fixed fulcrum at its center, and a rod 10ª, at one end connected to the truck lever, 3, the tie rod, 7, in this case being located at the ends of the levers, 5ª and 6ª, instead of at the middle, as in Fig. 1.

As shown in Figs. 5 and 6, the construction is similar to that of Figs. 1 and 2, except that the position of levers, 5 and 6, is transposed, placing the rod, 7, in compression, and the levers, 6, are slightly inclined in order that the pull rods, 10ᵇ and 11ᵇ, connected to the respective truck levers, 2 and 3, may clear each other, as indicated in Fig. 5.

Figure 8:
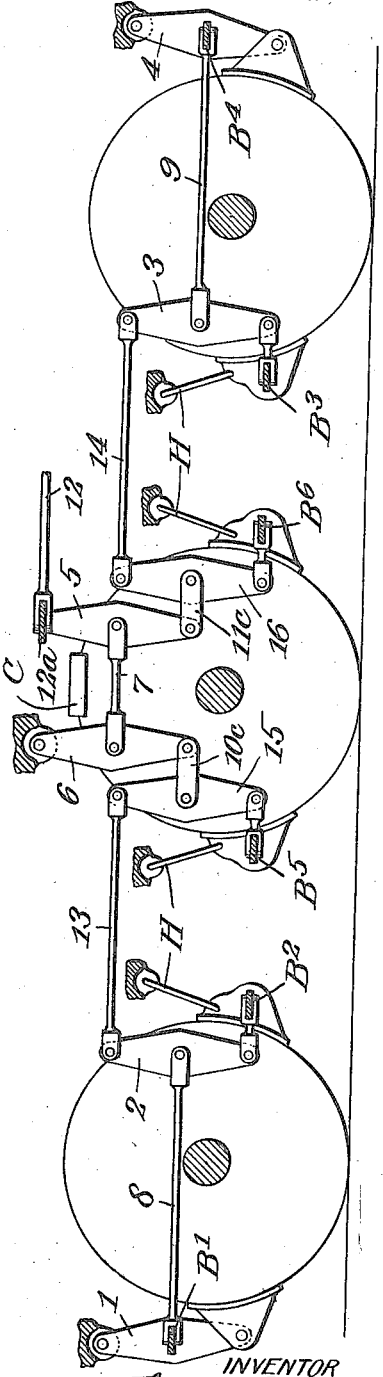

In Figs. 7 and 8, I have shown my improvement applied to a six wheeled truck and the arrangement of intermediate levers, 5 and 6, is similar to that of Fig. 1, except that these levers are located vertically at each side of the truck, and the lower ends of the said levers are coupled by means of the respective links, 11ᶜ and 10ᶜ, with the truck levers, 16 and 15, which are pivotally connected at their lower ends to the respective brake beams, B⁶ and B⁵, on opposite sides of the center pair of wheels. The upper ends of the center truck levers, 15 and 16, are connected by the rods, 13 and 14, respectively, with the live truck levers, 2 and 3, of the end pairs of wheels, which are substantially the same as in the four wheeled truck construction. The brake shoes for all intermediate brake beams, B², B⁵, B⁶, and B³, are supported by hangers, H, while the combined lever and hanger is employed at the end or dead truck levers, 1 and 4, as before described.

In all of these modifications, it will now be seen, the power from the brake cylinder pull rod is applied to a double set of intermediate levers located near the center of the truck, for transmitting the stresses in opposite directions to the double set of truck rods and levers located upon opposite sides of the truck and applying the pressure to shoes upon both sides of each pair of wheels.

Having now described my invention, what I claim as new and desire to secure by Letters Patent is:

1. In a brake rigging for pivoted trucks having a plurality of pairs of wheels, the combination with brake shoes applied to both sides of each pair of wheels, and a double set of truck levers and rods, one set at each side of the truck, of an intermediate floating lever upon each side of the truck, and having connections extending in opposite directions for operating the truck levers.

2. In a brake rigging for pivoted trucks having a plurality of pairs of wheels, the combination with brake shoes applied to both sides of each pair of wheels, and a double set of truck levers and rods, one set at each side of the truck, of an intermediate floating lever upon each side of the truck, and having a rod connected to one of the truck levers, an equalizer connecting said intermediate levers and another intermediate lever upon each side coupled to the first intermediate lever and to another truck lever.

3. In a brake rigging for pivoted trucks having a plurality of pairs of wheels, the combination with brake shoes applied to both sides of each pair of wheels, and a double set of truck levers and rods, one set at each side of the truck, of an intermediate floating lever upon each side of the truck, and having a rod connected to one of the truck levers, another intermediate lever having a fixed fulcrum and a rod connected to another truck lever, a rod coupling said intermediate levers together, and a brake cylinder pull rod having an equalizer attached to said intermediate floating levers.

4. In a brake rigging for pivoted trucks having a plurality of pairs of wheels, the combination with brake beams and brake shoes applied to both sides of each pair of wheels, two truck levers pivotally connected to each brake beam at the sides of the truck, pull rods for said truck levers, a pair of intermediate floating levers with pull rod connections for the respective sets of truck levers and an equalizer connecting said intermediate levers.

5. In a brake rigging for pivoted trucks having a plurality of pairs of wheels, the combination with brake beams and brake shoes applied to both sides of each pair of wheels, two live truck levers pivotally connected at their lower ends to the brake beam at one side of the end pair of wheels, two dead truck levers pivotally connected to the brake beam at the other side of said end pair of wheels, and a tie rod connecting each of said live truck levers to the latter brake beam.

6. In a brake rigging for pivoted trucks having a plurality of pairs of wheels, the combination with brake beams and brake shoes applied to both sides of each pair of wheels, two live truck levers pivotally connected to one of said brake beams, hangers for said beam, two dead truck levers supporting the opposite brake beam and carrying brake shoes, and tie rods connecting said live truck levers with said latter brake beam.

7. In a brake rigging for pivoted trucks having a plurality of pairs of wheels, the combination with brake shoes applied to both sides of each wheel, of a truck lever for each shoe, the truck levers for the outside shoes of both outside pairs of wheels comprising hanger-levers pivoted at their lower ends to the brake shoes and having fixed fulcrums, and connecting rods for actuating said levers.

8. In a brake rigging for pivoted trucks having a plurality of pairs of wheels, the combination with brake shoes applied to both sides of each wheel, of a truck lever for each shoe, the truck levers for the shoes at one side of both outside pairs of wheels comprising hanger levers supporting the brake shoes at their lower ends and having fixed fulcrums, and connecting rods for actuating said levers.

9. In a brake rigging for pivoted trucks having a plurality of pairs of wheels, the combination of brake shoes applied to both sides of each wheel, truck levers for said shoes, the truck levers for the shoes at one side of both outside pairs of wheels comprising hanger levers pivotally attached at their lower ends to the shoes and having fixed fulcrums, a brake beam supported at an intermediate point on said hanger levers, and connecting rods attached to said brake beam.

10. In a brake rigging for pivoted trucks having a plurality of pairs of wheels, the combination of brake shoes applied to both sides of each wheel, hanger levers pivotally attached to the shoes at one side of an outside pair of wheels and having fixed fulcrums, a brake beam supported at an intermediate point on said hanger levers, a brake beam upon the opposite side of said pair of wheels, live truck levers pivotally connected to the latter brake beam, and rods connecting said live truck levers with the opposite brake beam.

THOMAS L. BURTON.

Witnesses:
J. SNOWDEN BELL,
EDWARD A. WRIGHT.